(12) United States Patent
Buchholz et al.

(10) Patent No.: US 9,547,348 B2
(45) Date of Patent: Jan. 17, 2017

(54) REACTIVE POWER SUPPLY

(71) Applicant: Walter Kidde Portable Equipment Inc., Mebane, NC (US)

(72) Inventors: Matthew J. Buchholz, Canon City, CO (US); Larry R. Ratzlaff, Elgin, IL (US); Rick L. Mantz, Colorado Springs, CO (US)

(73) Assignee: WALTER KIDDE PORTABLE EQUIPMENT INC., Mebane, NC (US)

( * ) Notice: Subject to any disclaimer, the term of this patent is extended or adjusted under 35 U.S.C. 154(b) by 257 days.

(21) Appl. No.: 14/272,927

(22) Filed: May 8, 2014

(65) Prior Publication Data

US 2014/0337653 A1    Nov. 13, 2014

Related U.S. Application Data

(60) Provisional application No. 61/821,995, filed on May 10, 2013.

(51) Int. Cl.
*H02M 3/07* (2006.01)
*G06F 1/26* (2006.01)

(52) U.S. Cl.
CPC . *G06F 1/26* (2013.01); *H02M 3/07* (2013.01)

(58) Field of Classification Search
CPC .................................. H02M 3/07; G06F 1/26
See application file for complete search history.

(56) References Cited

U.S. PATENT DOCUMENTS

| | | |
|---|---|---|
| 5,267,997 A | 12/1993 | Farin et al. |
| 5,546,299 A | 8/1996 | Lenz |
| 5,615,100 A | 3/1997 | Radecker et al. |
| 5,661,645 A | 8/1997 | Hochstein |
| 5,973,603 A * | 10/1999 | Judy ............... G08B 7/06 340/508 |
| 6,095,661 A | 8/2000 | Lebens et al. |
| 6,142,992 A | 11/2000 | Cheng et al. |
| 6,147,848 A | 11/2000 | Boggs et al. |
| 6,222,746 B1 | 4/2001 | Kim |
| 6,385,059 B1 | 5/2002 | Telefus et al. |
| 6,420,839 B1 | 7/2002 | Chiang et al. |
| 6,534,934 B1 | 3/2003 | Lin et al. |
| 6,549,440 B2 | 4/2003 | Tassitino, Jr. et al. |
| 6,906,477 B2 | 6/2005 | Kazanov et al. |
| 6,906,932 B2 | 6/2005 | Kung et al. |
| 6,995,481 B2 | 2/2006 | Gibson |
| 7,177,131 B2 | 2/2007 | Chen et al. |

(Continued)

FOREIGN PATENT DOCUMENTS

| | | |
|---|---|---|
| EP | 0986799 A1 | 3/2000 |
| EP | 2506422 A1 | 10/2012 |
| WO | 03048796 A1 | 6/2003 |

*Primary Examiner* — Albert Wang
(74) *Attorney, Agent, or Firm* — Cantor Colburn LLP

(57) ABSTRACT

Embodiments are directed to a reactive power supply circuit comprising: a capacitor configured to provide an output of the power supply circuit based on power received from a power source, a processor configured to control the output based on at least one of: a state of a first switch that selectively couples the capacitor to the power source based on a detected level of the output, and a state of at least one second switch that selectively couples the capacitor to the power source based on a determination of a state of one or more loads coupled to the output.

20 Claims, 7 Drawing Sheets

(56) References Cited

U.S. PATENT DOCUMENTS

| | | |
|---|---|---|
| 7,233,112 B2 | 6/2007 | Burke et al. |
| 7,327,092 B2 | 2/2008 | Caiafa et al. |
| 7,723,929 B2 | 5/2010 | Orr |
| 7,948,114 B2 | 5/2011 | Ng |
| 7,957,116 B2 | 6/2011 | So |
| 8,129,864 B2 | 3/2012 | Baarman et al. |
| 8,285,502 B2 * | 10/2012 | Kenly et al. |
| 2003/0184314 A1 * | 10/2003 | Barak ................... G05F 1/46 324/658 |
| 2011/0128762 A1 * | 6/2011 | Ripley ................... H02M 3/07 363/62 |
| 2011/0154068 A1 * | 6/2011 | Huang ................... H02M 3/07 713/300 |
| 2012/0286681 A1 | 11/2012 | Hausman, Jr. |
| 2012/0313538 A1 | 12/2012 | Kumar et al. |
| 2012/0314459 A1 | 12/2012 | Park et al. |
| 2013/0049622 A1 | 2/2013 | Angeles |

* cited by examiner

REACTIVE POWER SUPPLY

CROSS-REFERENCE TO RELATED APPLICATIONS

This application claims the benefit of U.S. provisional patent application Ser. No. 61/821,995, filed May 10, 2013, the entire contents of which are incorporated herein by reference.

BACKGROUND

A power supply, such as a reactive power supply, may be designed to provide power to one or more loads. The one or more loads may generally consume relatively little power (e.g., current) during normal operating conditions, but may consume substantially larger power (e.g., current) when engaged or activated. If the power supply is designed or selected to provide sufficient power to accommodate the loads when engaged/active, then during normal operating conditions the power supply may, in effect, provide excess power. The excess power is dissipated (as heat) in one or more components that may be associated with the power supply, resulting in increased operational cost and a need for larger components or excessive component de-rating to ensure reliable and safe operation.

BRIEF SUMMARY

An embodiment of the disclosure is directed to a reactive power supply circuit comprising: a capacitor configured to provide an output of the power supply circuit based on power received from a power source, a processor configured to control the output based on at least one of: a state of a first switch that selectively couples the capacitor to the power source based on a detected level of the output, and a state of at least one second switch that selectively couples the capacitor to the power source based on a determination of a state of one or more loads coupled to the output.

An embodiment of the disclosure is directed to a method comprising: monitoring, by a level detector device, a parameter associated with an output of a reactive power supply, determining, by the level detector device, that the monitored parameter is not less than a threshold, and commanding a power switch to open to isolate a power source based on determining that the monitored parameter is not less than the threshold.

An embodiment of the disclosure is directed to a reactive power supply circuit comprising: a power source, a switch coupled to the power source and configured to selectively isolate the power source from a remainder of the power supply circuit, a capacitor coupled to the switch and configured to provide an output voltage, and a level detection device configured to monitor the output voltage, determine that the monitored output voltage is not less than a threshold, and command the switch to open to isolate the power source based on determining that the monitored output voltage is not less than the threshold.

An embodiment of the disclosure is directed to a method comprising: determining, by a processor, a state of one or more loads coupled to an output of a reactive power supply, determining, by the processor, a state of one or more switches that determine an amount of power provided to the output by a power source of the reactive power supply, and commanding the state of the one or more switches based on the determined state of the one or more switches.

An embodiment of the disclosure is directed to a reactive power supply circuit comprising: a power source, a plurality of capacitors configured to be selectively coupled to the power source via a corresponding plurality of switches, a capacitor coupled to each of the plurality of capacitors and configured to provide an output of the reactive power supply, and a processor configured to command a state of the plurality of switches based on a determination of a state of one or more loads coupled to the output of the reactive powers supply.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
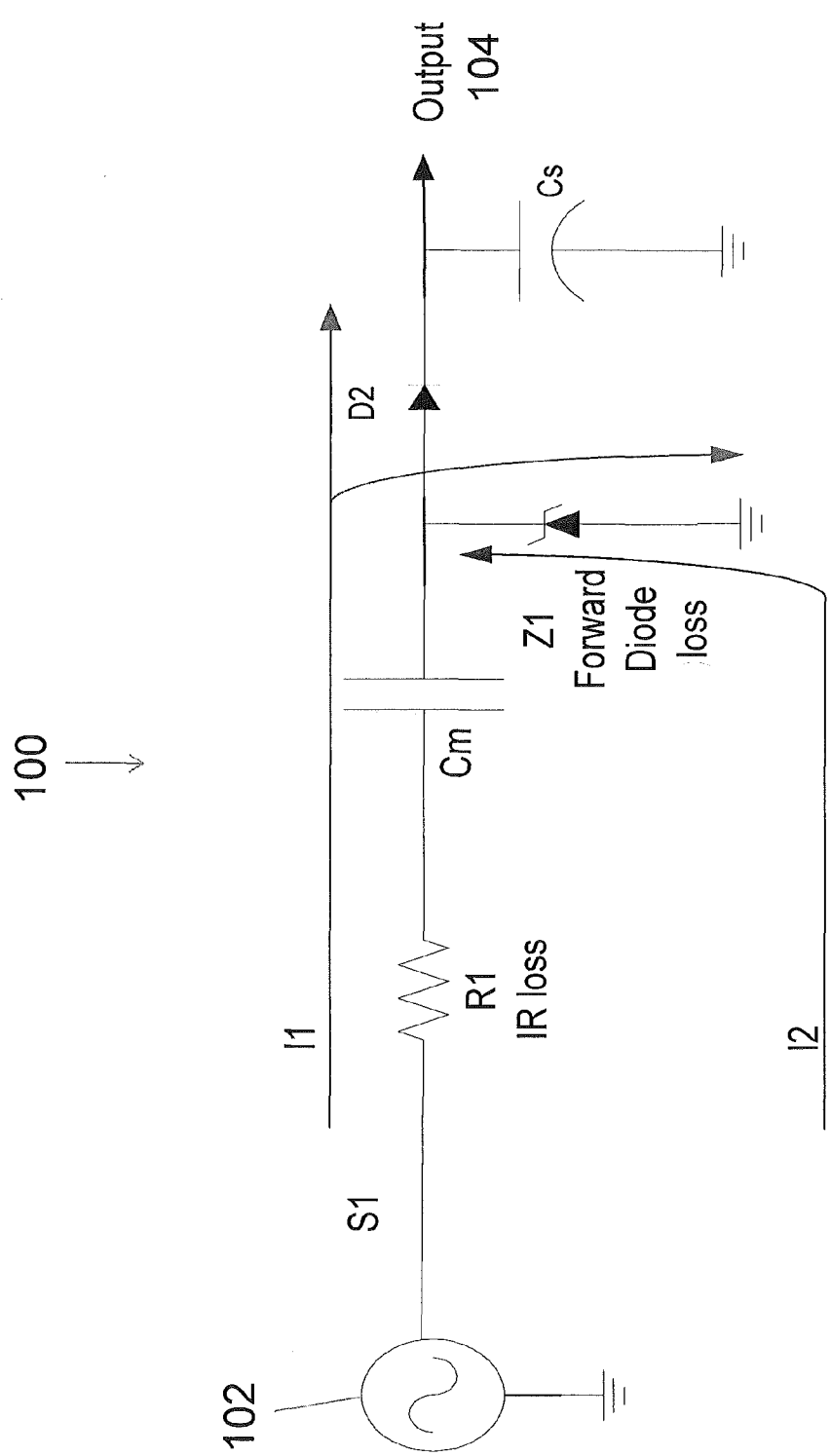
FIG. 1 illustrates a power supply circuit in accordance with the prior art.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for reducing or eliminating circuit heating. In some embodiments, power that is drawn from a power supply (e.g., a reactive power supply) may be controlled based on a threshold. In some embodiments, a parameter associated with an output signal may be detected. Based on the detection, a control signal may selectively open or close a power switch.

Referring to FIG. 1, a power supply circuit 100 in accordance with the prior art is shown. The power supply circuit 100 is shown as including an alternating current (AC) power source 102. In some instances, the power source 102 may correspond to a sinusoid with a given amplitude and frequency. The power source 102 may be coupled to a resistor R1. The resistor R1 may be coupled to a capacitor Cm. The capacitor Cm may be coupled to a zener diode Z1 and to a diode D2. The diode D2 may be coupled to a capacitor Cs. A signal (e.g., a voltage) taken from (e.g., across) the capacitor Cs may be used as an output 104 of the power supply 100 to drive one or more loads (not shown in FIG. 1).

As shown in FIG. 1, currents I1 and I2 may be generated as a result of the configuration of the power supply circuit 100. Current I1 may flow through resistor R1. A portion of current I1 may flow through zener diode Z1, and the remainder of the current I1 may flow through the diode D2. Current I2 may flow through zener diode Z1. The currents I1 and I2 may be at least partially a result of the power source 102 having been selected or designed to provide sufficient power to accommodate the loads. Accordingly, excess power may be available when one or more of the loads are inactive or disengaged. The excess power may be dissipated as heat in the resistor R1 and the zener diode Z1.

Figure 2A:
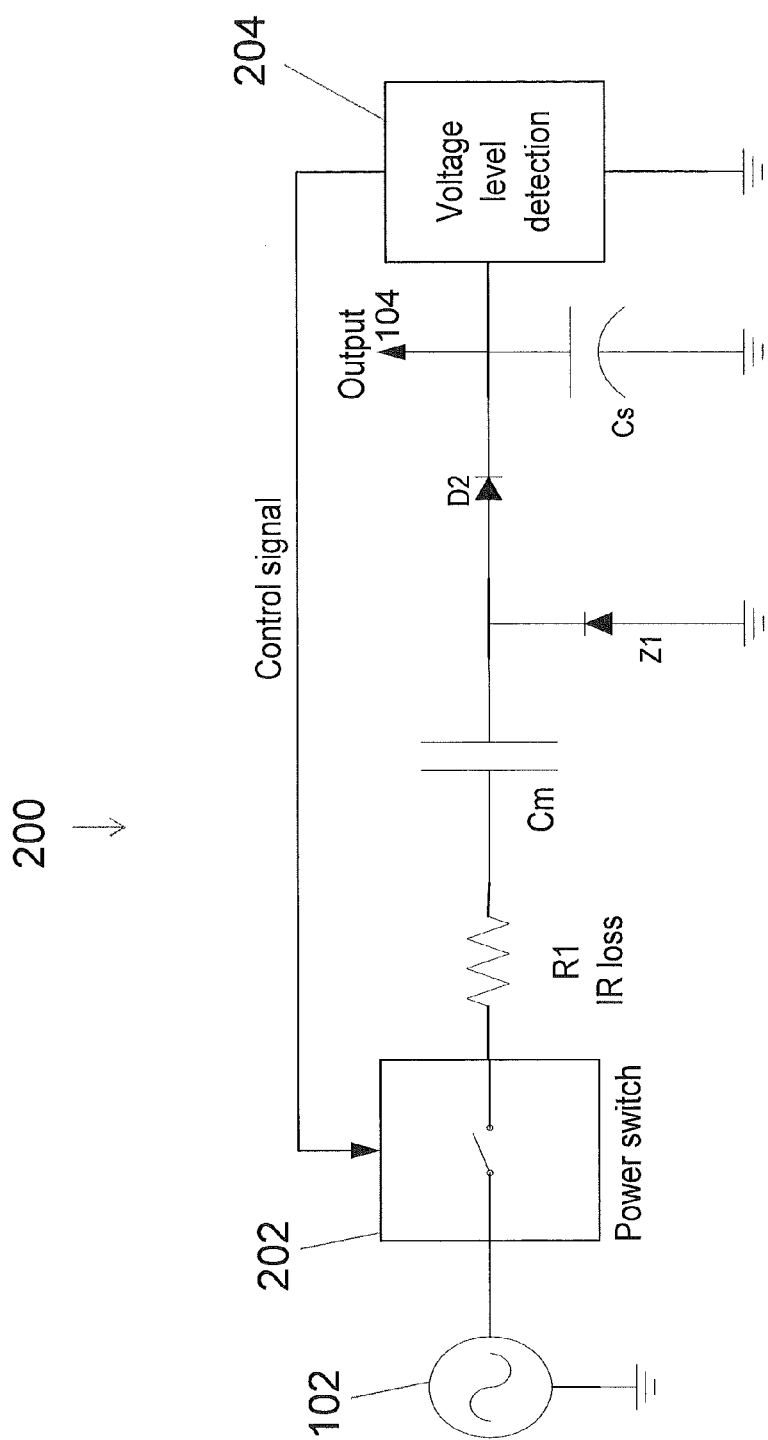
FIG. 2A illustrates an adaptive power supply circuit in accordance with one or more embodiments.

Referring to FIG. 2A, a power supply circuit 200 in accordance with one or more embodiments is shown. The power supply circuit 200 includes many of the components/devices shown and described above in connection with FIG. 1, and so, a complete re-description is omitted for the sake of brevity. The power supply circuit 200 may include a power switch 202 coupled between the power source 102 and the resistor R1. The power switch 202 may be configured to operate in one of two states (e.g., "on" or "off"). In the first or "on" state, the power switch 202 may be "closed" such that the power source 102 may be used to charge the capacitor Cs. In the second or "off" state, the power switch 202 may be "open" such that the power source 102 may be isolated from the rest of the power supply circuit 200.

A voltage level detection device 204 may be used to determine the state of the power switch 202. As shown in FIG. 2A, the voltage level detection device 204 may be coupled to the capacitor Cs in order to monitor the output 104. When the output 104 is less than a first threshold, the voltage level detection device 204 may cause the power switch 202 to the "on" state via a control signal in order to increase or replenish the output 104. Such a condition may result from enabling or activating one or more loads. When the output 104 is greater than a second threshold, the voltage level detection device 204 may cause the power switch 202 to the "off" state via the control signal in order to avoid applying excess power to the components (e.g., resistor R1 and zener diode Z1) of the power supply circuit 200. Such a condition may result from disabling or deactivating one or more loads. In some embodiments, the first threshold and the second threshold may be the same value. In some embodiments, the first threshold and the second threshold may be different values. For example, hysteresis may be used to avoid repetitively changing the state of the power switch 202.

Figure 2B:
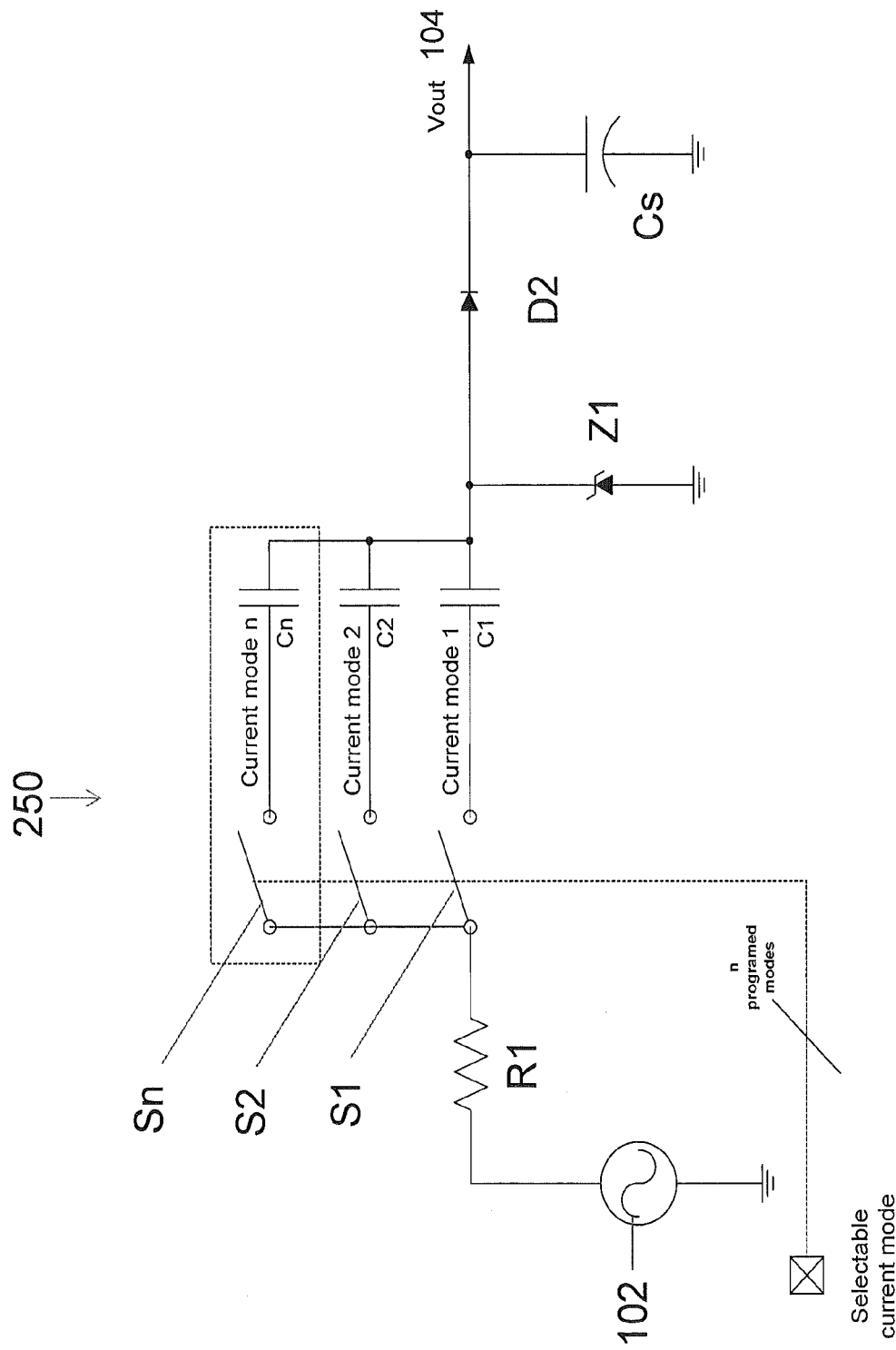
FIG. 2B illustrates an n-mode power supply circuit in accordance with one or more embodiments.

The power supply circuit 200 of FIG. 2A may be referred to as an "adaptive power supply" in the sense that the power supply circuit 200 may respond to changes in loads on the output 104 in real-time or substantially in real-time. By comparison, FIG. 2B illustrates an exemplary power supply circuit 250 that may be referred to as an "n-stage power supply" or "n-mode power supply." In this respect, the power supply circuit 250 may respond to demands for power on the basis of an occurrence of an event, such as a turning-on (or turning-off) or engagement (or disengagement) of one or more loads (e.g., an alarm).

The power supply circuit 250 includes many of the same components and devices described above in connection with the power supply circuit 200 of FIG. 2A, and so, a complete re-description is omitted for the sake of brevity. Comparing FIG. 2A and FIG. 2B, the capacitor Cm may be replaced by a bank of capacitors C1, C2, . . . Cn.

A first leg or lead of each of the capacitors C1 through Cn may be coupled to the diode Z1. A second leg or lead of each of the capacitors C1, C2, . . . Cn may be selectively coupled to the resistor R1 via a respective switch S1, S2, . . . Sn.

The state (e.g., open or closed) of each of the switches S1 through Sn may be determined in accordance with a selection technique or algorithm. In some embodiments, a state table may be stored in a memory device. The state table may map the state of the switches S1 through Sn to a particular power level (e.g., a particular current) required to be provisioned for one or more loads. In this manner, when a load is turned-on (or turned-off) or engaged (or disengaged), the state of one or more of the switches S1 through Sn may be adjusted accordingly.

In some embodiments, a power supply circuit may include a combination of the components and devices shown in FIG. 2A and FIG. 2B. For example, in some embodiments, a power supply circuit may include one or more of a power switch 202, a voltage level detection device 204, capacitors C1 through Cn, and switches S1 through Sn. In other words, in some embodiments a power supply circuit may incorporate adaptive supply and n-mode supply aspects.

Figure 3:
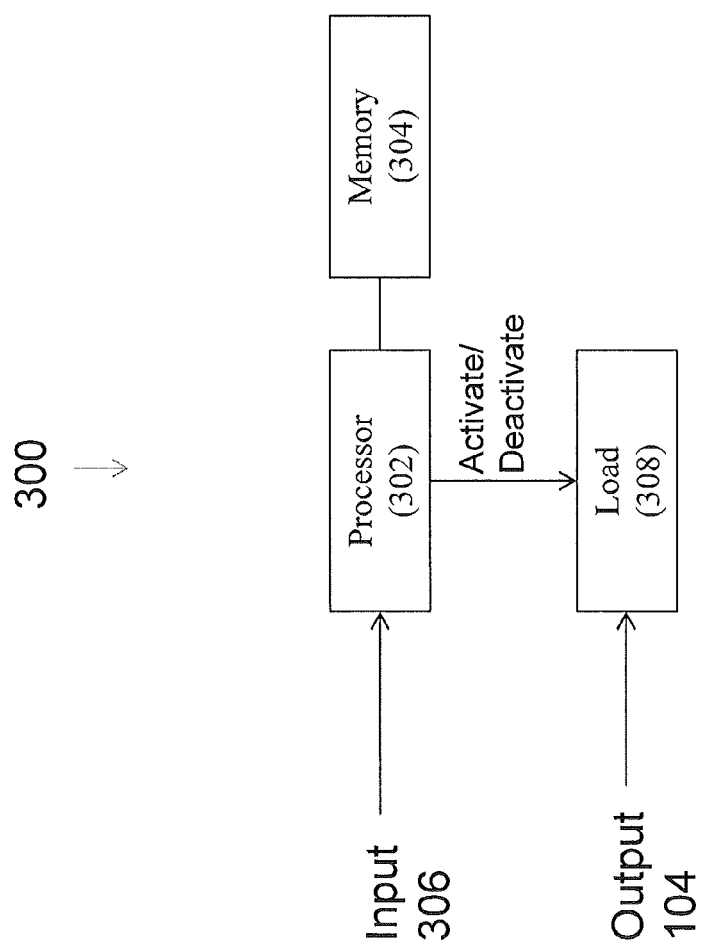
FIG. 3 illustrates an exemplary circuit architecture in accordance with one or more embodiments.

Turning now to FIG. 3, an exemplary circuit architecture 300 in accordance with one or more embodiments is shown. As described further below, in some embodiments the circuit 300 may be associated with one or more alarms, such as a smoke or fire detector system, a carbon monoxide detector system, etc.

The circuit 300 may include one or more processors 302, such as a microprocessor, a digital signal processor, etc. The processor(s) 302 may be coupled to a memory 304. The memory 304 may have instructions stored thereon that, when executed by the one or more processors 302, cause the processor(s) 302 (or one or more devices associated therewith) to perform one or more methodological acts as described herein.

In some embodiments, the memory 304 may store data that may be operated on by the processor 302. For example, in connection with the power supply circuit 250 of FIG. 2B, the memory 304 may store state table data indicative of the state of the switches S1 through Sn for each of one or more loads 308.

In some embodiments the processor 302 may receive one or more inputs 306. The input(s) 306 may be indicative of one or more parameters being monitored, such as smoke, carbon monoxide, etc.

When a monitored parameter is less than a threshold, the processor 302 may drive an active/deactivate signal to disengage or deactivate the one or more loads 308. Similarly, when the monitored parameter exceeds a threshold, the processor 302 may drive the active/deactivate signal to engage or activate the one or more loads 308.

Engaging or activating a load 308 may cause the load 308 to consume power from the output 104. In the context of the power supply circuit 200 of FIG. 2A, the consumption of power may cause the voltage level detection device 204 to turn "on" the power switch 202 as described above in order to maintain the output 104 at a sufficiently high level. In the context of the power supply circuit 250 of FIG. 2B, the state of the switches S1 through Sn may be selected or commanded based on an identification of the load 308 that is being engaged.

In some embodiments, the load(s) 308 may be indicative of one or more of a sounder, a voice annunciator, a strobe light, or an LED indicator. The load(s) 308 may be activated to provide a warning, such as a warning of excess smoke or carbon monoxide.

The circuit architecture 300 is illustrative. In some embodiments, different circuit architectures and/or different devices or components may be used.

Figure 4:
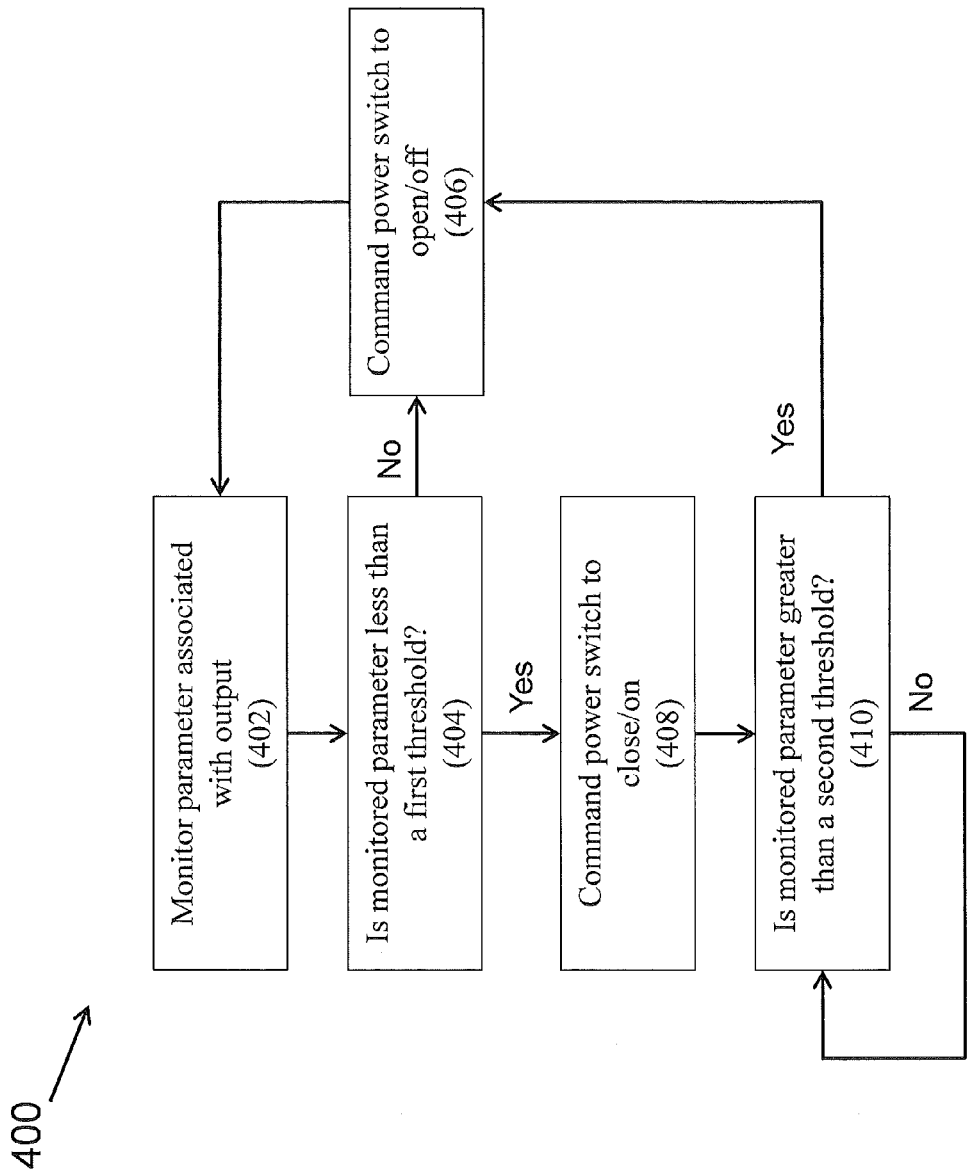
FIG. 4 illustrates a flow chart of an exemplary method in accordance with one or more embodiments.

Turning now to FIG. 4, a flow chart of an exemplary method 400 is shown. The method 400 may be executed by one or more systems, circuits, devices, or components, such as those described herein. For example, the method 400 may be used to selectively couple a power source (e.g., power source 102 of FIG. 2A) to an output (e.g., output 104 of FIG. 2A) via one or more components or devices (e.g., power switch 202 of FIG. 2A).

In block 402, a parameter associated with an output power (e.g., output 104) of a power supply may be monitored. For example, one or more of a voltage, current, power, and energy may be monitored in block 402.

In block 404, a determination may be made by a level detector (e.g., voltage level detection device 204 of FIG. 2A) whether the monitored parameter is less than a first threshold. If the comparison indicates that the monitored parameter is not less than the first threshold (e.g., the "No" path is taken out of block 404), then flow may proceed from block 404 to block 406.

In block 406, a power switch (e.g., power switch 202 of FIG. 2A) may be commanded to be open/off in order to isolate a power source (e.g., power source 102 of FIG. 2A). From block 406, flow may proceed to block 402 to continue monitoring the parameter.

If a determination is made in block 404 that the monitored parameter of block 402 is less than the first threshold (e.g., the "Yes" path is taken out of block 404), then flow may proceed from block 404 to block 408.

In block 408, a power switch (e.g., power switch 202 of FIG. 2A) may be commanded to be closed/on in order to couple a power source (e.g., power source 102 of FIG. 2A) to an output (e.g., output 104 of FIG. 2A). From block 408, flow may proceed to block 410.

In block 410, a determination may be made by a level detector (e.g., voltage level detection device 204 of FIG. 2A) whether the monitored parameter is greater than a second threshold. If the monitored parameter is greater than the second threshold (e.g., the "Yes" path is taken out of block 410), then flow may proceed from block 410 to block 406 in order to command the power switch (e.g., power switch 202 of FIG. 2A) to open/off. Otherwise, if the monitored parameter is not greater than the second threshold (e.g., the "No" path is taken out of block 410), then the flow may remain at block 410 in order to continue coupling a power source (e.g., power source 102 of FIG. 2A) to an output (e.g., output 104 of FIG. 2A).

The first and second thresholds described above in connection with FIG. 4 may be the same value. Alternatively, the first and second thresholds may be different values in order to prevent repetitively toggling the state of a power switch around a given value within a short amount of time.

Figure 5:
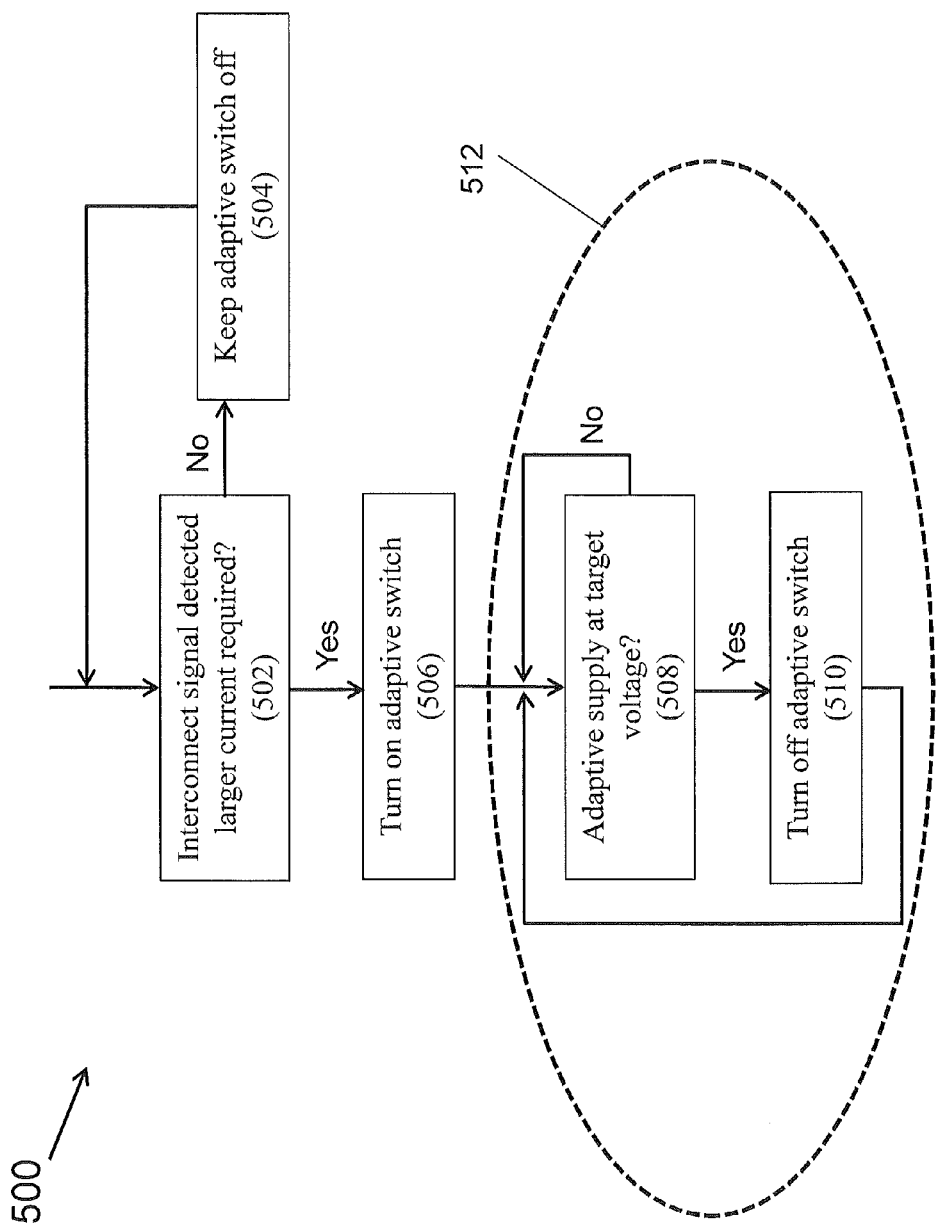
FIG. 5 illustrates a flow chart of an exemplary method in accordance with one or more embodiments.

Turning now to FIG. 5, a flow chart of an exemplary method 500 is shown. The method 500 may be executed by one or more systems, circuits, devices, or components, such as those described herein. For example, the method 500 may be used control a state of an adaptive switch (e.g., switch 202 of FIG. 2A). While not shown in FIG. 5, as part of an initialization task, the adaptive switch may be turned off or opened.

In block 502, a determination may be made whether an interconnect signal detects that a larger amount of current is required. A larger amount of current may be a result of activating or engaging one or more loads (e.g., load 308 of FIG. 3).

If a larger amount of current is not required (e.g., the "No" path is taken out of block 502), then flow may proceed from block 502 to block 504. In block 504, the adaptive switch may be kept off, and flow may proceed from block 504 to block 502.

If a larger amount of current is required (e.g., the "Yes" path is taken out of block 502), then flow may proceed from block 502 to block 506.

In block 506, the adaptive switch may be turned on. Turning on the adaptive switch may be used to increase an amount of current that is available. Flow may proceed from block 506 to block 508.

In block 508, a determination may be made whether an adaptive power supply output has reached a target voltage. If the target voltage is not reached (e.g., the "No" path is taken out of block 508), flow may remain at block 508. Otherwise, if the target voltage is reached (e.g., the "Yes" path is taken out of block 508), then flow may proceed from block 508 to block 510.

In block 510, the adaptive switch may be turned off. Turning off the adaptive switch may help to avoid dissipating excess power, or power that is not required to drive one or more loads. Flow may proceed from block 510 to block 508.

The portion of the method 500 enclosed by the circle 512 may correspond to a control loop. The control loop 512 may be executed in hardware. In some embodiments, the control loop 512 may be executed in connection with software.

Figure 6:
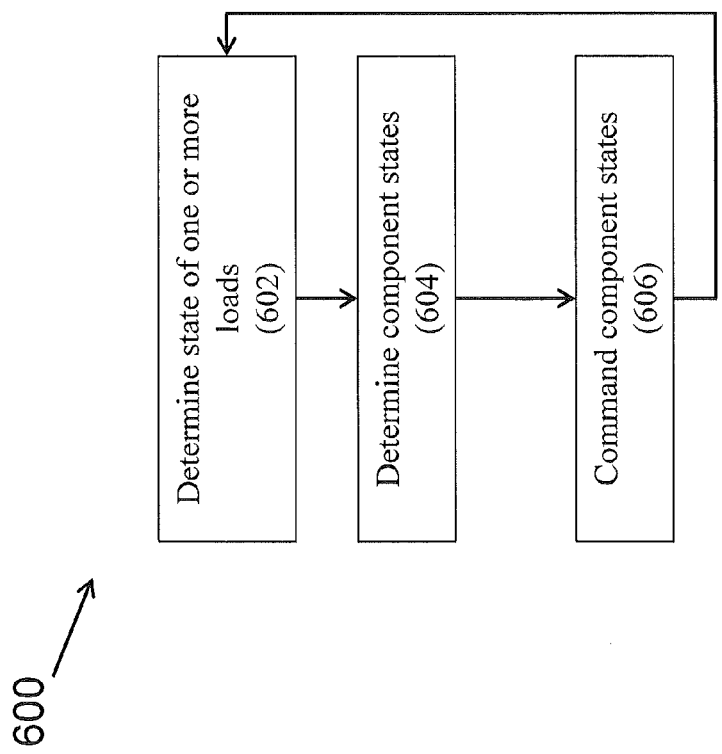
FIG. 6 illustrates a flow chart of an exemplary method in accordance with one or more embodiments.

Turning now to FIG. 6, a flow chart of an exemplary method 600 is shown. The method 600 may be executed by one or more systems, circuits, devices, or components, such as those described herein. The method 600 may be used to control an amount of power provided by a power source (e.g., power source 102 of FIG. 2B) based on the state of one or more components or devices (e.g., switches S1 through Sn of FIG. 2B).

In block 602, a state of one or more loads may be determined. For example, if the loads include one or more of a sounder, a voice annunciator, a strobe light, and an LED indicator, the state (e.g., 'on' or 'off') for each of the loads may be determined in block 602.

In block 604, positions or states for one or more components may be determined. For example the state of the switches S1 through Sn of FIG. 2B may be determined based on the state of the one or more loads determined in block 602. As part of block 604, a state table that maps a power requirement of one or more engaged loads to states for the switches S1 through Sn may be accessed.

In block 606, the component states (e.g., switch positions) determined in block 604 may be commanded with respect to the one or more components (e.g., the switches S1 through Sn). From block 606, flow may proceed to block 602 to establish a loop for monitoring the state of the one or more loads in block 602. In this manner, the method 600 may react to a change in a state of one or more of the loads.

The methods 400, 500, and 600 are illustrative. In some embodiments, one or more of the blocks or operations (or a portion thereof) may be optional. In some embodiments, additional blocks or operations not shown may be included. In some embodiments, the blocks or operations may execute in an order or sequence different from what is shown in FIGS. 4, 5, and 6. In some embodiments, one or more blocks or operations of a first method (e.g., the method 400) may be combined with one or more blocks of one or more of the other methods (e.g., the method 500 and/or the method 600).

Embodiments of the disclosure may be tied to one or more particular machines. For example, a level detector may determine whether an output of a power supply circuit is less than or greater than one or more thresholds, and may command a power switch to selectively couple a power source to the remainder of the power supply circuit and/or the output based on the determination.

Embodiments of the disclosure may be used to eliminate or reduce circuit heating relative to conventional architectures. In this manner, improved safety or reliability may be obtained. An operational lifetime associated with one or more components or devices may be extended as a result of reducing stress on the components.

Flexible architectures have been described herein that enable one of skill in the art to scale circuits to various output levels based on mere changes in component values or types. Embodiments of the disclosure may be implemented in environments where loads: (1) consume minimal power or current when inactive or disengaged, and (2) consume relatively large amounts of power or current when active or engaged.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A reactive power supply circuit comprising:
a power source;
a first electronic device, at least one second electronic device and additional electronic devices provided in a serial arrangement downstream from the power source;
a capacitor disposed downstream from the serial arrangement and configured to provide an output of the power supply circuit based on power received from the power source,
a processor configured to control the output based on at least one of:
a state of a first switch disposed upstream from the first electronic device that selectively couples the capacitor to the power source based on a detected level of the output, and
a state of at least one second switch configured to be respectively coupled to the at least one second electronic device downstream from the first electronic device such that the at least one second switch selectively couples the capacitor to the power source based on a determination of a state of one or more loads coupled to the output.

2. The reactive power supply circuit of claim 1, wherein the processor is configured to control the output based on the state of the first switch that selectively couples the capacitor to the power source based on the detected level of the output.

3. The reactive power supply circuit of claim 1, wherein the processor is configured to control the output based on the state of the at least one second switch that selectively couples the capacitor to the power source based on the determination of the state of the one or more loads coupled to the output.

4. The reactive power supply circuit of claim 3, wherein the at least one second switch comprises a plurality of switches.

5. A reactive power supply circuit comprising:
a capacitor configured to provide an output of the power supply circuit based on power received from a power source,
a processor configured to control the output based on at least one of:
a state of a first switch that selectively couples the capacitor to the power source based on a detected level of the output, and
a state of at least one second switch that selectively couples the capacitor to the power source based on a determination of a state of one or more loads coupled to the output, wherein:
the processor is configured to control the output based on the state of the first switch that selectively couples the capacitor to the power source based on the detected level of the output, and
the processor is configured to control the output based on the state of the at least one second switch that selectively couples the capacitor to the power source based on the determination of the state of the one or more loads coupled to the output.

6. A method comprising:
monitoring, by a level detector device, a parameter associated with an output of a reactive power supply;
determining, by the level detector device, that the monitored parameter is not less than a threshold;
commanding a first power switch to open to isolate a power source based on determining that the monitored parameter is not less than the threshold; and
commanding at least one second power switch to open to isolate a power source based on a determination of a state of one or more loads coupled to the output.

7. The method of claim 6, further comprising:
determining, by the level detector device, that the monitored parameter is less than the threshold subsequent to determining that the monitored parameter is not less than the threshold; and
commanding the first power switch to close to couple the power source to the output based on determining that the monitored parameter is less than the threshold.

8. The method of claim 7, further comprising:
determining, by the level detector device, that the monitored parameter is greater than a second threshold subsequent to commanding the power switch to close; and
commanding the first power switch to open based on determining that the monitored parameter is greater than the second threshold.

9. The method of claim 8, wherein the threshold and second threshold are different values.

10. The method of claim 6, wherein the one or more loads comprise at least one of a sounder, a voice annunciator, a strobe light and an LED indicator that is selectively activated.

11. The method of claim 6, wherein the one or more loads are configured to be activated to provide a warning with respect to at least one of smoke and carbon monoxide.

12. The method of claim 6, wherein the monitored parameter comprises at least one of voltage, current, power, and energy.

13. A reactive power supply circuit comprising:
a power source;
a first electronic device, at least one second electronic device and additional electronic devices provided in a serial arrangement downstream from the power source;
a switch coupled to the power source, disposed upstream from the first electronic device and configured to selectively isolate the power source from a remainder of the power supply circuit;
a capacitor coupled to the switch, disposed downstream from the serial arrangement and configured to provide an output voltage; and
a level detection device configured to monitor the output voltage, determine that the monitored output voltage is not less than a threshold, and command the switch to open to isolate the power source based on determining that the monitored output voltage is not less than the threshold.

14. The power supply circuit of claim 13, wherein the level detection device is configured to determine that the monitored output voltage is less than the threshold subsequent to determining that the monitored output voltage is not less than the threshold and command the switch to close to couple the power source to the capacitor based on determining that the monitored output voltage is less than the threshold.

15. The power supply circuit of claim 14, wherein the level detection device is configured to determine that the monitored output voltage is greater than a second threshold subsequent to commanding the switch to close and command the switch to open based on determining that the monitored output voltage is greater than the second threshold.

16. The power supply circuit of claim 15, wherein the threshold and the second threshold are the same value.

17. A method comprising:
determining, by a processor, a state of one or more loads coupled to an output of a reactive power supply;
determining, by the processor, a state of one or more switches that determine an amount of power provided to the output by a power source of the reactive power supply;
commanding a power switch to open to isolate the reactive power supply based on determining that a monitored parameter is not less than a threshold; and
commanding the state of the one or more switches based on the determined state of the one or more switches and a determination of the state of the one or more loads.

18. The method of claim 17, further comprising:
accessing, by the processor, a state table that maps the state of the one or more switches to a power level required by one or more of the loads that are determined by the processor to be engaged,
wherein the processor determines the state of the one or more switches based on having accessed the state table.

19. A reactive power supply circuit comprising:
a power source;
a plurality of capacitors configured to be selectively coupled to the power source via a corresponding plurality of switches;
a capacitor coupled to each of the plurality of capacitors and configured to provide an output of the reactive power supply; and
a processor configured to command a state of a first switch disposed upstream from the plurality of switches that selectively couples the capacitor to the power source based on a detected level of the output and to command a state of the plurality of switches based on a determination of a state of one or more loads coupled to the output of the reactive power supply.

20. The reactive power supply circuit of claim 19, further comprising:
a memory configured to store a state table that maps the state of the switches to a power level required by one or more of the loads that are determined to be engaged,
wherein the processor is configured to access the state table from the memory in order to command the state of the plurality of switches.

* * * * *